(12) United States Patent
Kim et al.

(10) Patent No.: US 12,509,158 B2
(45) Date of Patent: Dec. 30, 2025

(54) VEHICLE BODY

(71) Applicants: HYUNDAI MOTOR COMPANY, Seoul (KR); KIA CORPORATION, Seoul (KR); HYUNDAI MOBIS CO., LTD., Seoul (KR)

(72) Inventors: Do Hoi Kim, Sejong-si (KR); Sung Chul Shin, Incheon (KR); Jae Sup Byun, Seongnam-si (KR); Jang Ho Kim, Seoul (KR)

(73) Assignees: HYUNDAI MOTOR COMPANY, Seoul (KR); KIA CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 408 days.

(21) Appl. No.: 18/219,773

(22) Filed: Jul. 10, 2023

(65) Prior Publication Data
US 2024/0199128 A1   Jun. 20, 2024

(30) Foreign Application Priority Data

Dec. 14, 2022   (KR) .......................... 10-2022-0175241

(51) Int. Cl.
  *B62D 25/06*   (2006.01)
  *B62D 25/04*   (2006.01)
  *B62D 27/02*   (2006.01)

(52) U.S. Cl.
  CPC ............. *B62D 25/06* (2013.01); *B62D 25/04* (2013.01); *B62D 27/02* (2013.01); *B62D 27/023* (2013.01)

(58) Field of Classification Search
  CPC ........ B62D 25/04; B62D 25/06; B62D 25/00; B62D 25/02; B62D 17/02; B62D 17/023; B62D 17/06; B62D 17/065
  USPC .......... 296/203.01–4, 210, 193.05, 6, 29, 30
  See application file for complete search history.

(56) References Cited

U.S. PATENT DOCUMENTS

| | | |
|---|---|---|
| 9,266,570 B2 | 2/2016 | Kim et al. |
| 2015/0251708 A1 | 9/2015 | Kim et al. |
| 2023/0080893 A1 | 3/2023 | Kim et al. |
| 2023/0147372 A1 | 5/2023 | Kim et al. |
| 2024/0124062 A1 | 4/2024 | Kim |

FOREIGN PATENT DOCUMENTS

| | | | |
|---|---|---|---|
| JP | 6099207 B2 | * | 3/2017 |
| KR | 20150104269 A | | 9/2015 |
| KR | 20230067148 A | | 5/2023 |
| KR | 20230068661 A | | 5/2023 |
| KR | 20240054057 A | | 4/2024 |

OTHER PUBLICATIONS

JP6099207 Text Year: 2017.*

* cited by examiner

*Primary Examiner* — Dennis H Pedder
(74) *Attorney, Agent, or Firm* — Lempia Summerfield Katz LLC

(57) ABSTRACT

A vehicle body includes: a roof side member including a hollow pipe member and a flange. In particular, a vehicle-frame-side inner end portion of the flange is fixed to a roof rail, and a lower end portion of the flange extends downward from the pipe member and is fixed to a pillar member. The vehicle body further includes an outer panel combined with the outside of the roof side member and forming a load path between the roof side member and the pillar member by coupling a lower end portion of the roof side member and an upper end portion of the pillar member to each other.

20 Claims, 21 Drawing Sheets

VEHICLE BODY

CROSS REFERENCE TO RELATED APPLICATION

The present application claims priority to Korean Patent Application No. 10-2022-0175241, filed on Dec. 14, 2022, the entire contents of which are incorporated herein by reference.

FIELD

The present disclosure relates to a vehicle body and, more particularly, to a vehicle body having a fabricated-type structure available on various types of vehicles.

BACKGROUND

A vehicle frame forms a space in which a passenger stays and a space onto which goods is loaded, assures the safety of the passenger in the event of a vehicle collision or the like. Thus, the vehicle frame is considered as a major factor when designing the exterior appearance of a vehicle.

In a vehicle frame in the related art, A, B, and C pillars are arranged in this order in the direction from the front of a vehicle to the rear thereof. A space for mounting a wind shield glass is formed between the A pillars arranged on both sides of the vehicle. A space for installing a front door is formed between the A pillar and the B pillar. A space for installing a rear door is formed between the B pillar and the C pillar. A space for mounting a rear wind shield glass is formed between the C pillars arranged on both sides of the vehicle. Moreover, in some cases, a roof is combined with the tops of the A, B, and C pillars.

Structures of the A, B, and C pillars in the related art are panel types and are coupled, by welding, to each other. The whole body in a body-in-white (BIW) state is assembled, and then undergoes in a painting process. Therefore, a vehicle frame body in the related art is advantageous in mass production, but requires many apparatus, such as a mold. In this respect, a vehicle frame body in the related art is disadvantageous in ensuring competitiveness in a future mobility market that depends on a trend toward small quantity batch production.

The foregoing is intended merely to aid in understanding the background of the present disclosure and therefore should not be interpreted to admit that the statements in this section fall within the purview of the related art that is already known to a person of ordinary skill in the art.

SUMMARY

An object of the present disclosure is to provide a structure of a vehicle frame capable of reducing the number of components of a vehicle frame and varying one portion of the vehicle frame in configuration, thereby ensuring competitiveness in a future mobility market that depends on a trend toward small quantity batch production.

A present disclosure is not limited to the object mentioned above. From the following detailed description, an object not mentioned above would be clearly understandable by a person of ordinary skill in the art.

In order to accomplish the above-mentioned object, according to an aspect of the present disclosure, there is provided a vehicle body including: a roof side member comprising a hollow pipe member integrally formed by molding in such a manner as to extend in a bent state in a lengthwise direction, and a flange surrounding at least one portion of the pipe member, a vehicle-frame-side inner end portion of the flange being fixed to a roof rail, and a lower end portion of the flange extending downward from the pipe member and being fixed to a pillar member; and an outer panel combined with the outside of the roof side member and forming a load path between the roof side member and the pillar member by coupling a lower end portion of the roof side member and an upper end portion of the pillar member to each other.

In the vehicle body, the outer panel may extend downward while being supported on a vehicle-frame-side outer surface of the roof side member, but may be bent inward from a vehicle frame along a curved lower portion of the roof side member, thereby supporting the pipe member.

In the vehicle body, the outer panel may be formed in such a manner as to extend in a vehicle-length direction and to overlap one part of a lower end portion of the roof side member and in such a manner as to extend downward from a center portion thereof and to overlap one part of an upper end portion of the pillar member.

In the vehicle body, the flange, the pillar member, and the outer panel may be fixed to one another through at least one side-fastening bolt fastened toward a vehicle-width direction from under the pipe member.

In the vehicle body, the side-fastening bolt may be fastened to the outer panel, the flange, and the pillar member by sequentially passing therethrough.

In the vehicle body, each of the side-fastening bolts may be arranged to be spaced away from each other in an upward-downward direction and in a vehicle-length direction in such a manner that a load transferred from the pillar member to the pipe member is distributed.

In the vehicle body, the vehicle-frame-side inner end portion of the flange may be coupled to a lower part of one end portion of the roof rail in such a manner that a load applied to a roof rail is transferred to the pipe member, and thus the flange may support the roof rail.

In the vehicle body, the inner end portion of the flange and the one end portion of the roof rail may be fixed to each other through at least one vertically fastening bolt fastened in an upward-downward direction.

In the vehicle body, the flange may include an inner flange combined, along a vehicle-length direction, with a vehicle-frame-side inner surface of the pipe member in a manner that runs a long distance, but extending vertically from the pipe member; an upper flange combined, along the vehicle-length direction, with an upper portion of the pipe member in a manner that runs a long distance, but extending from the pipe member in a manner that is directed inward from a vehicle frame; and a lower flange combined with a lower portion of the pipe member in a manner that runs a long distance along a vehicle-length direction, but extending downward from the pipe member.

In the vehicle body, the inner flange, the upper flange, and the lower flange may be formed of metal material.

In the vehicle body, the outer panel may be combined with the pipe member.

In the vehicle body, the outer panel may be formed in such a manner as to cover both the lower flange and the upper end portion of the pillar member, starting from a vehicle-frame-side outer surface of the pipe member.

In the vehicle body, the outer panel may be formed to be spaced away from the lower flange in a manner that is directed outward from the vehicle frame and thus to form a cross section in the forms of an open polygon, together with the lower flange.

The vehicle body may further include a roof rail mounting bracket extending toward the roof rail from the inner flange in such a manner that the vehicle-frame-side inner end portion of the flange is fixed to the roof rail, the roof rail being fastened to the roof rail mounting bracket.

In the vehicle body, the flange may be formed by injection molding on the outside of the pipe member in a state where the pipe member is inserted thereinto, and the flange may include: an inner portion extending from the pipe member in a manner that is directed inward from a vehicle frame and coupled to the roof rail; a central portion extending in a vehicle-length direction, thereby surrounding the pipe member; and a lower portion extending downward from the pipe member, thereby being coupled to the pillar member.

In the vehicle body, the outer panel may be combined with the flange.

In the vehicle body, the lower portion may be formed in such a manner that an inner surface thereof overlaps the pillar member and that an outer surface thereof overlaps the outer panel.

In the vehicle body, an insert bracket that is combined with a vehicle-frame-side inner end portion of the pipe member and extends in a manner that is directed inward from the vehicle frame may be inserted into the inner portion.

In the vehicle body, the inner portion may be formed by injection molding in a state where the insert bracket, together with the pipe member, is inserted thereinto.

In the vehicle body, the inner portion, the central portion, and the lower portion of the flange may be integrally formed into one piece.

As described above, according to the embodiments of the present disclosure, the number of components of the vehicle frame can be decreased, and one portion of the vehicle frame can vary readily in configuration. A structure of the vehicle frame can be provided in such a manner as to ensure competitiveness in the future mobility market that depends on the trend toward small quantity batch production.

The present disclosure is not limited to the effect mentioned above. From the following detailed description, an effect not mentioned would be clearly understandable by a person of ordinary skill in the art to which the present disclosure pertains.

BRIEF DESCRIPTION OF THE DRAWINGS

The above and other objects, features and other advantages of the present disclosure should be more clearly understood from the following detailed description when taken in conjunction with the accompanying drawings, in which.

DETAILED DESCRIPTION

Figure 1:
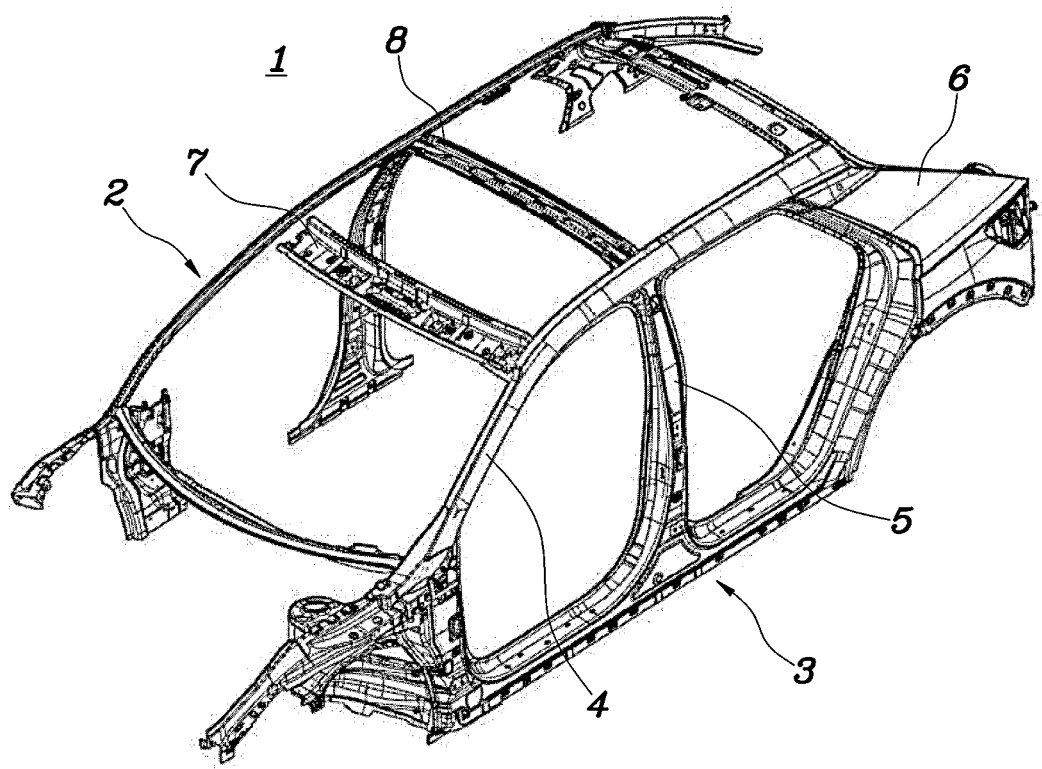
FIG. 1 is a view illustrating a structure of a vehicle frame that may find application in embodiments of the present disclosure.

Embodiments of the present disclosure, which are disclosed in the present specification, are provided only for the purpose of describing the present disclosure in terms of specific structures or functions. The embodiments of the present disclosure may be practiced in various forms, and the present disclosure should not be construed as being limited to the embodiments that are described in the present specification.

Various modifications may be made to the embodiments of the present disclosure, and thus, the embodiments of the present disclosure may have various forms. Therefore, specific embodiments are illustrated in the drawings and is described in detail in the present specification. However, the specific embodiments of the present disclosure are not intended to impose any limitation on the present disclosure, and all modifications, equivalents, substitutions that are included within the technical idea of the present disclosure should be understood as falling within the scope of the present disclosure.

Unless otherwise defined, each of all the terms used throughout the present specification, including technical or scientific terms, has the same meaning as is normally understood by a person of ordinary skill in the art to which the present disclosure pertains. The term as defined in commonly used dictionaries should be construed as having the same contextual meaning as that used in the relevant field of technology and, unless otherwise explicitly defined in the present specification, should not be construed as having an excessively implied meaning or a purely literal meaning.

For the purpose of disclosure, the embodiments of the present disclosure are described in detail below referring to the accompanying drawings. The same or similar constituent elements are given the same reference numeral, and descriptions thereof are not repeated.

The terms "module" and "unit" are hereinafter interchangeably or individually used to refer to a constituent element only for convenience in description in the present specification and therefore are not themselves intended to take on different meanings or depict different functions. When a component, device, element, or the like of the present disclosure is described as having a purpose or performing an operation, function, or the like, the component, device, or element should be considered herein as being "configured to" meet that purpose or to perform that operation or function.

In describing the embodiments of the present disclosure, detailed descriptions of a well-known technology related thereto have been omitted when determined as making the nature and gist of the present disclosure obfuscated. In addition, the accompanying drawings serve only to help easily understand the embodiments disclosed in the present specification. It should be understood that the technical idea disclosed in the present specification is not limited by the accompanying drawings and that any alteration of, any equivalent of, and any substitute for, a constituent element of the present disclosure that fall within the scope of the technical idea of the present disclosure are included within the scope of the present disclosure.

The terms "first," "second," and so on are used to describe various constituent elements, but do not impose any limitation on the various constituent elements. These terms are used only to distinguish one constituent element from another.

It should be understood that a constituent element, when referred to as being "coupled to" or "connected to" a different constituent element, may also be directly coupled to or directly connected to the different constituent element or may also be coupled to or connected to the different constituent element with a third constituent element in between. It should be understood that a constituent element, when referred to as being "directly coupled to" or "directly connected to" a different constituent element, may be coupled to or connected to the different constituent element with a third constituent element in between.

A noun in singular form has the same meaning as when used in plural form, unless it has a different meaning in context.

The terms "include," "have," and the like in the present application are intended to indicate that a feature, a number, a step, an operation, a constituent element, a component, or a combination of these, which is described in the specification, is present, and thus should be understood not to preclude the possibility that one or more other features, numbers, steps, operations, constituent elements, components, or combinations of these will be present or added.

FIG. 1 is a view illustrating a structure of a vehicle frame that can be utilized in the embodiments of the present disclosure.

With reference to FIG. 1, a vehicle frame 1 in the embodiments of the present disclosure may be divided into an upper vehicle frame 2 and a lower vehicle frame 3. An A-pillar member 4, the B-pillar member 5, and a C-pillar member 6 may be formed between the upper vehicle frame 2 and the lower vehicle frame 3.

In addition, both sides of the upper vehicle frame 2 may be coupled to each other by a front roof rail 7 and a center roof rail 8.

With the structure of the vehicle frame 1, as described above, the lower vehicle frame 3, the A-pillar, B-pillar, and C-pillar members (4, 5 and 6), and the roof rails (7 and 8) are utilized in a shared manner, thereby reducing the manufacturing cost and making the upper vehicle frame 2 available in prefabricated form. Thus, a vehicle body may vary according to a type of vehicle. As such, it is possible to accommodate a future mobility market's demand for small-quantity batch production and custom-made production. Detailed configurations and structures of the vehicle body according to the embodiments of the present disclosure are described below with reference to FIGS. 2 to 21.

Figure 2:
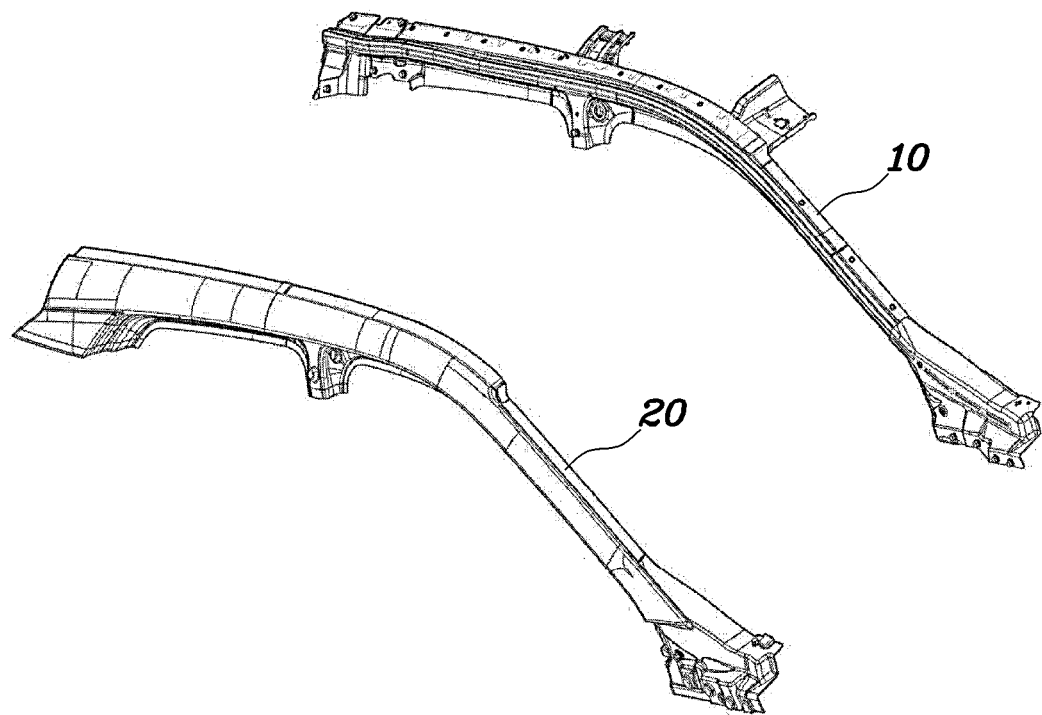
FIG. 2 is an exploded view illustrating an upper vehicle frame according to a first embodiment of the present disclosure.
Figure 20:
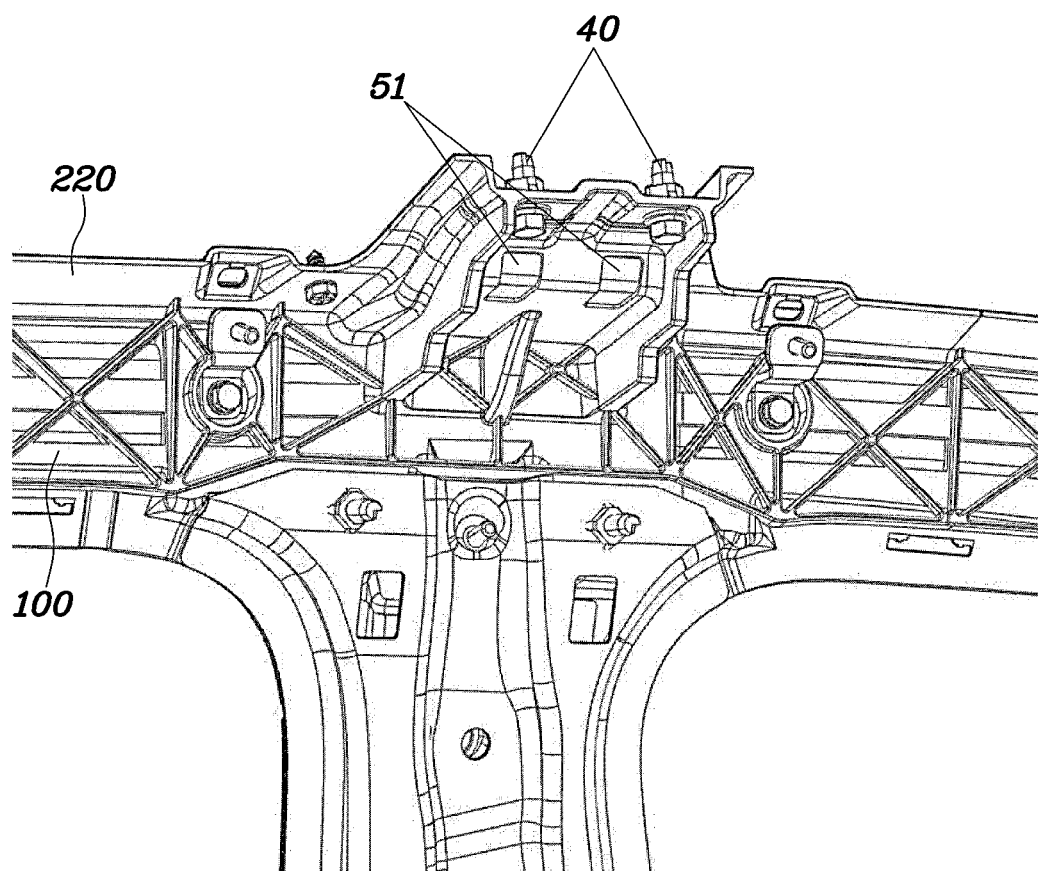
FIG. 20 is a view illustrating a pipe member and a flange that are opposite in direction to the portion of the roof side member in FIG. 16.
Figure 21:
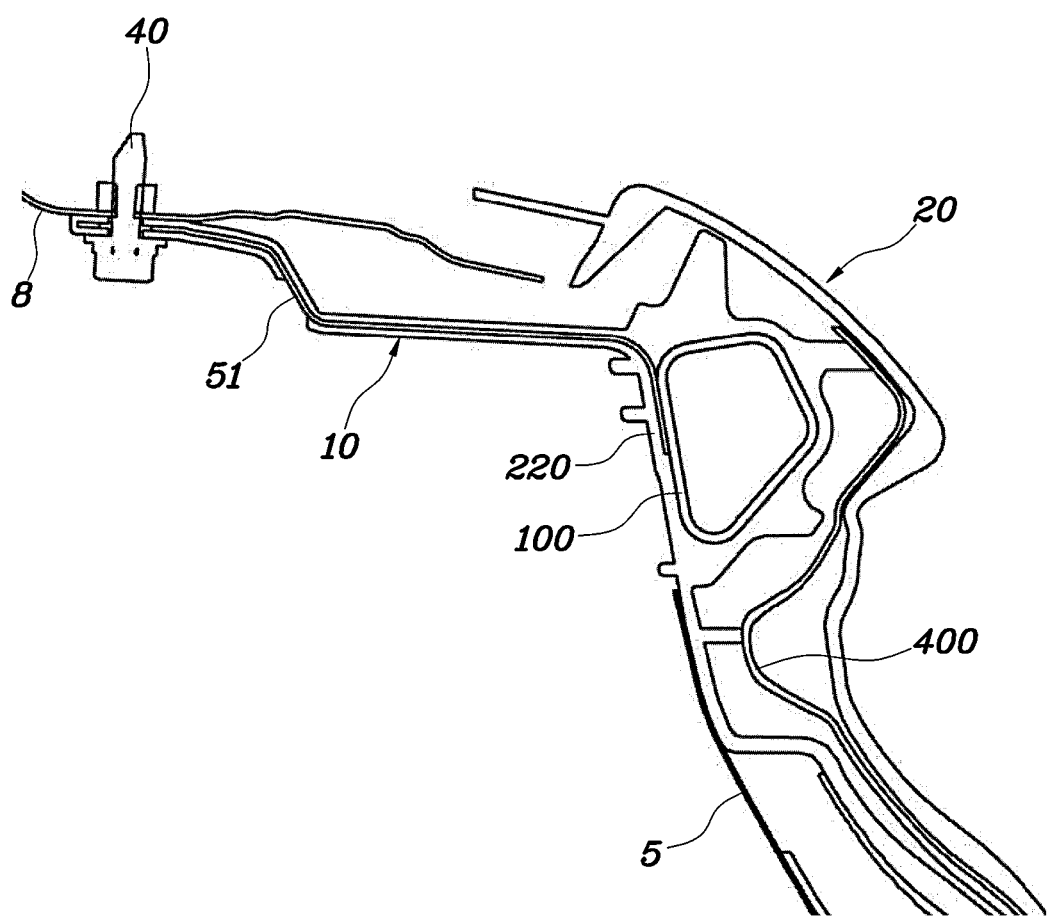
FIG. 21 is a cross-sectional view taken along line I-I' on FIG. 16.

With reference to FIGS. 2 and 21, the vehicle bodies according to the embodiments of the present disclosure may each be configured to include a roof side member 10 and an outer panel 400 and may each further include an outer garnish 20. However, constituent elements according to the embodiments of the present disclosure are illustrated in a focused manner in FIGS. 2 to 21. Of course, an actual vehicle body may have more or fewer constituent elements than the vehicle bodies according to the embodiments of the present disclosure.

First, a roof side member 10 is configured to include a pipe member 100 and a flange 200.

The pipe member 100 is a hollow member that is integrally formed by molding in such a manner as to extend in a bent state in a lengthwise direction. In other words, the pipe member 100 is a principal member that provides rigidity to the roof side member 10.

The flange 200 surrounds at least one portion of the pipe member 100. A vehicle-frame-side inner end portion of the flange 200 is fixed to roof rails 7 and 8, and a lower end portion thereof extends downward from the pipe member 100 and is fixed to a pillar member 5. The flange 200 assists the pipe member 100, which is a primary source, in providing the rigidity, and protects the pipe member 100 from damage or deformation.

As described below, the flanges 200 include a first flange 210 and a second flange 220. A vehicle body according to a first embodiment of the present disclosure includes the first flange 210, and a vehicle body according to second embodiment of the present disclosure includes the second flange 220.

The outer panel 400 is coupled to the outside of the roof side member 10. The outer panel 400 connects a lower end portion of the roof side member 10 and an upper end portion of the pillar member 5 to each other, and forms a load path between the roof side member 10 and the pillar member 5.

In this case, the pillar member 5 may mean the B-pillar member that is positioned in the vehicle center portion. The pillar member 5 may extend from the lower vehicle frame 3 to the upper vehicle frame 2 and may be configured with a plurality of layers stacked on top of each other.

The outer panel 400 extends downward while being supported on a vehicle-frame-side outer surface of the roof side member 10, but is bent inward from the vehicle frame along a curved lower portion of the roof side member 10, thereby possibly supporting the pipe member 100. Accordingly, a load applied to the pillar member 5 may be transferred to the pipe member 100.

In addition, the outer panel 400 may be formed in such a manner as to extend in a vehicle-length direction and overlap one part of the lower end portion of the roof side member 10. Moreover, the outer panel 400 may be formed in such a manner as to extend downward from a center portion thereof and overlap one part of an upper end portion of the pillar member 5. Accordingly, the pillar member 5 and the roof side member 10 may be coupled to each other through respective wider surfaces thereof. Thus, a structure that facilitates the distribution of load may be implemented.

More specifically, the flange 200, the pillar member 5, and the outer panel 400 may be fixed to one another through at least one side-fastening bolt 30 that is fastened toward a vehicle-width direction from under the pipe member 100.

In this case, the side-fastening bolt is fastened to the outer panel 400, the flange 200, and the pillar member 5 by sequentially passing therethrough. Thus, the flange 200, the pillar member 5, and the outer panel 400 may be fixed to one another in an overlapping manner.

In addition, each of the two side-fastening bolts 30 may be arranged to be spaced away from each other in an upward-downward direction and in the vehicle-length direction in such a manner that a load transferred from the pillar member 5 to the pipe member 100 is distributed. In other words, one portion of the side-fastening bolt is arranged close to the pipe member 100 and to be spaced in the vehicle-length direction away from the pipe member 100. Thus, the load may be made to be readily transferred to the pipe member 100. The rest of the side-fastening bolt is arranged to be more downward than the one portion thereof. Thus, the load may be made to be distributed to an entire area of the outer panel 400.

The vehicle-frame-side inner end portion of the flange 200 is coupled to a lower part of one end portion of each of the roof rails 7 and 8 in such a manner that the load applied to each of the roof rails 7 and 8 is transferred to the pipe member 100. Thus, the flange 200 may support each of the roof rails 7 and 8. Accordingly, the roof side member 10, particularly, one pipe member 100 thereof, may share the load applied to the roof rails 7 and 8 and may efficiently resist the applied load.

In this case, the inner end portion of the flange 200 and one end portion of each of the roof rails 7 and 8 may be fixed to each other through at least one vertically fastening bolt 40 that is fastened in the upward-downward direction.

The vehicle body according to each of the embodiments of the present disclosure is described below.

Figure 3:
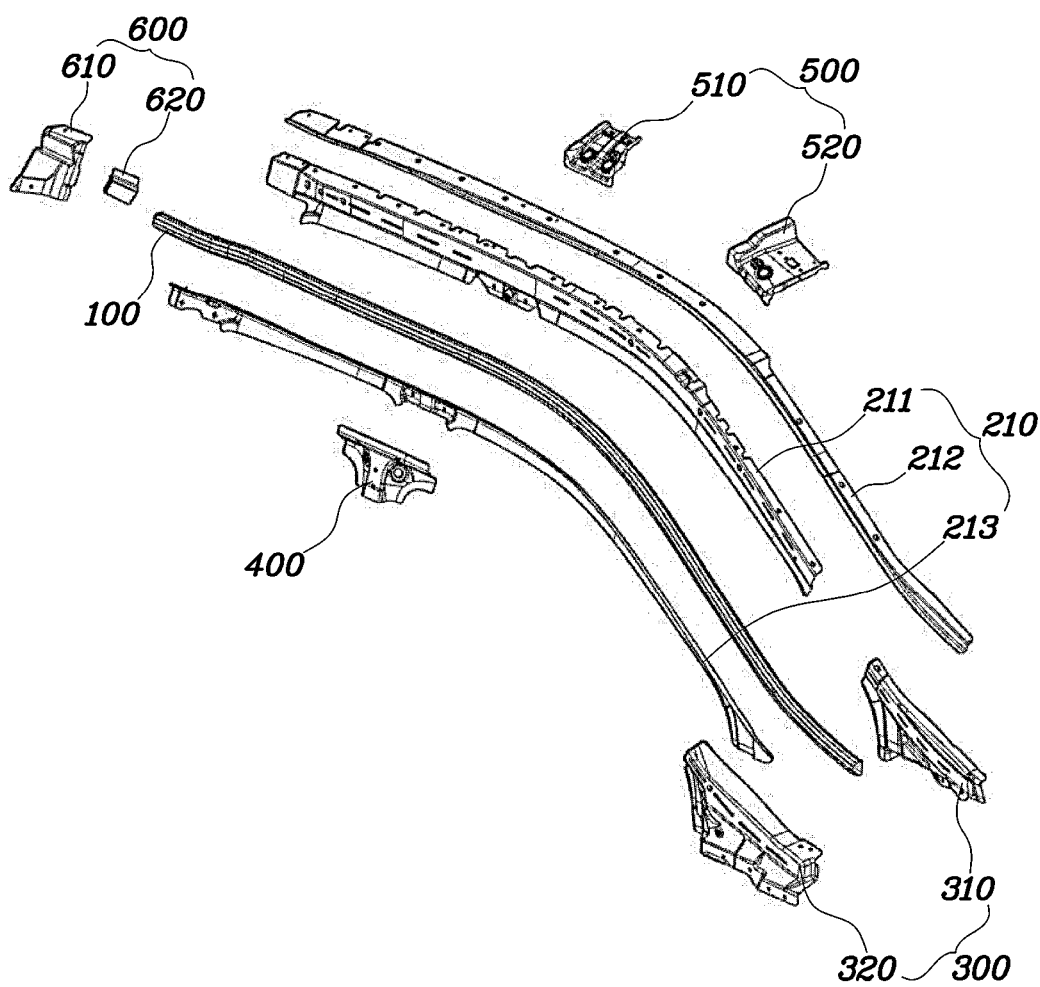
FIG. 3 is an exploded view illustrating a roof side member according to the first embodiment of the present disclosure.

FIG. 2 is an exploded view illustrating an upper vehicle frame according to the first embodiment of the present disclosure. FIG. 3 is an exploded view illustrating a roof side member according to the first embodiment of the present disclosure.

With reference to FIGS. 2 and 3, the upper vehicle frame 2 according to the first embodiment of the present disclosure may be configured to include the roof side member 10 and the outer garnish 20.

The roof side member 10 may be configured to include the pipe member 100, the flange 210, an A-pillar mounting bracket 300, the outer panel 400, a roof rail mounting bracket 500, and a C-pillar mounting bracket.

According to the first embodiment of the present disclosure, a plurality of parts may form the flange 210. The plurality of parts may include an inner flange 211, an upper flange 212, and a lower flange 213.

The inner flange 211 is combined with a vehicle-frame-side inner surface of the pipe member 100 along the vehicle-length direction, extending vertically from the pipe member 100.

The upper flange 212 is combined with an upper portion of the pipe member 100 along the vehicle-length direction, extending from the pipe member 100 in a manner that is directed inward from the vehicle frame.

The lower flange 213 is combined with a lower portion of the pipe member 100 in the vehicle-length direction, extending downward from the pipe member 100.

A combination structure of the pillar member 5 of the vehicle body according to the first embodiment of the present disclosure is described below.

Figure 4:
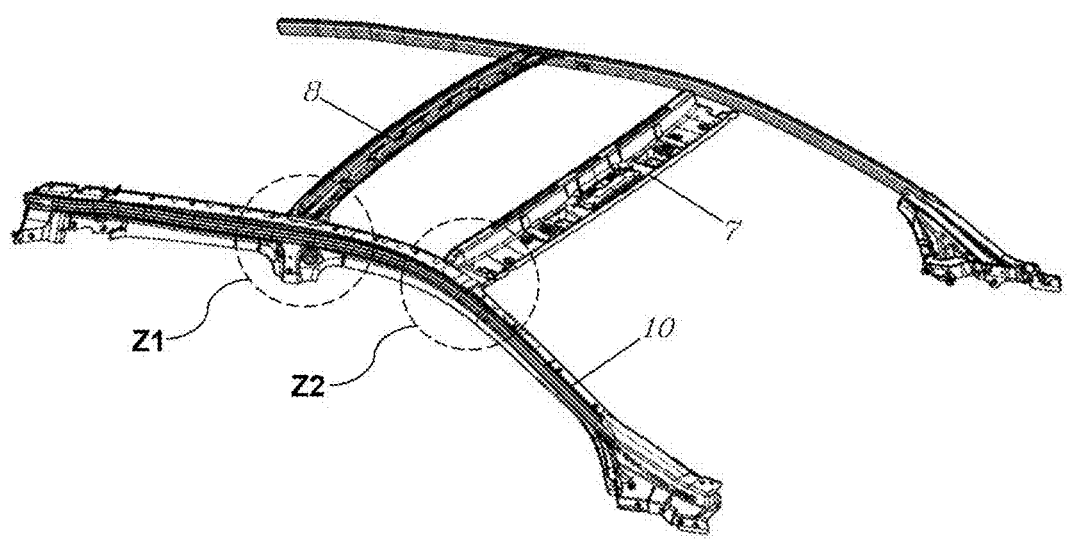
FIG. 4 is a view illustrating a portion of a vehicle body that is combined with a pillar member and roof rails according to the first embodiment of the present disclosure.
Figure 5:
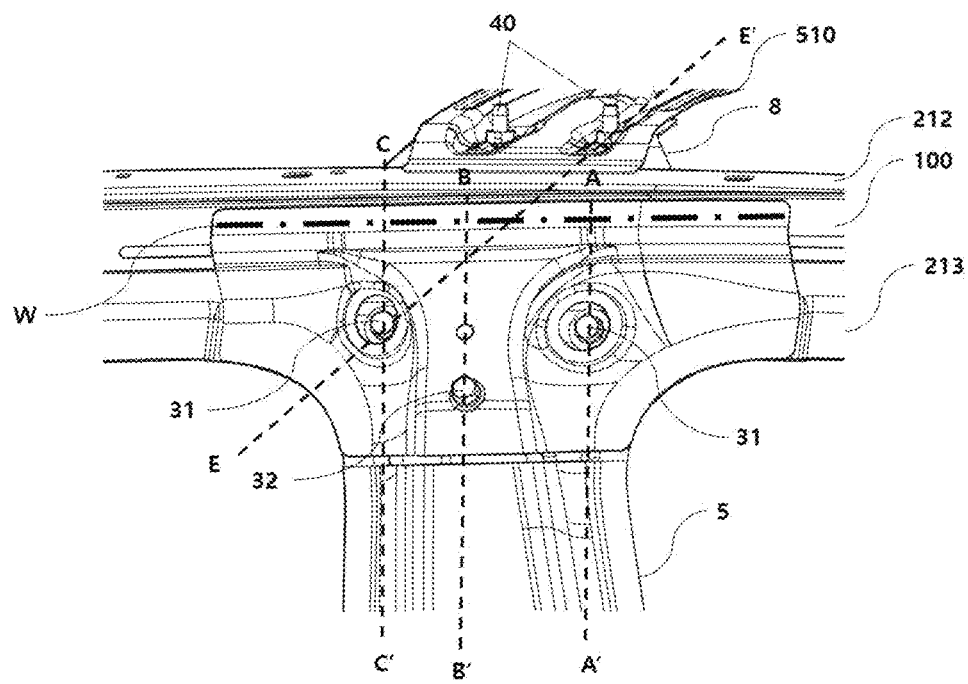
FIG. 5 is an enlarged view illustrating a Z1 region of FIG. 4.
Figure 6:
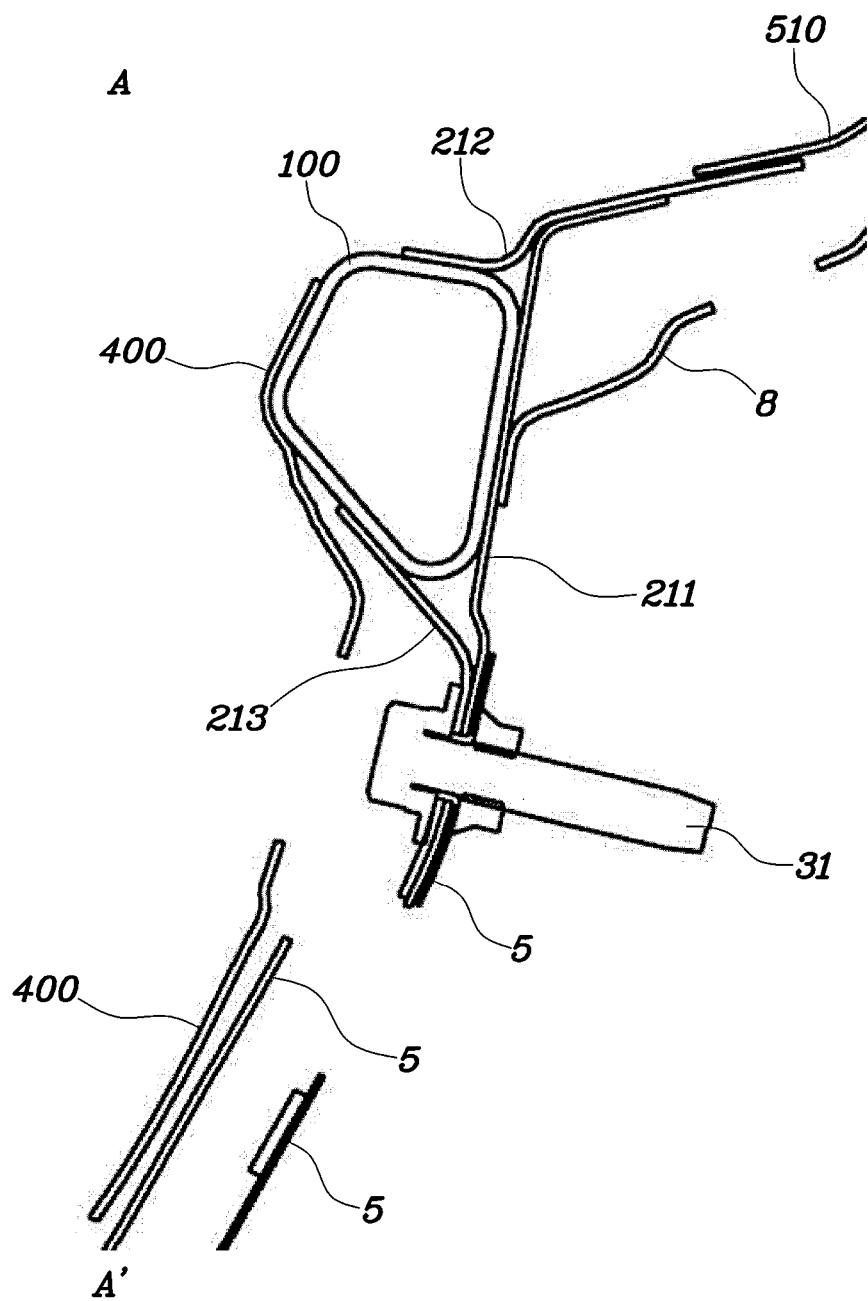
FIG. 6 is a cross-sectional view taken along line A-A' on FIG. 5.
Figure 7:
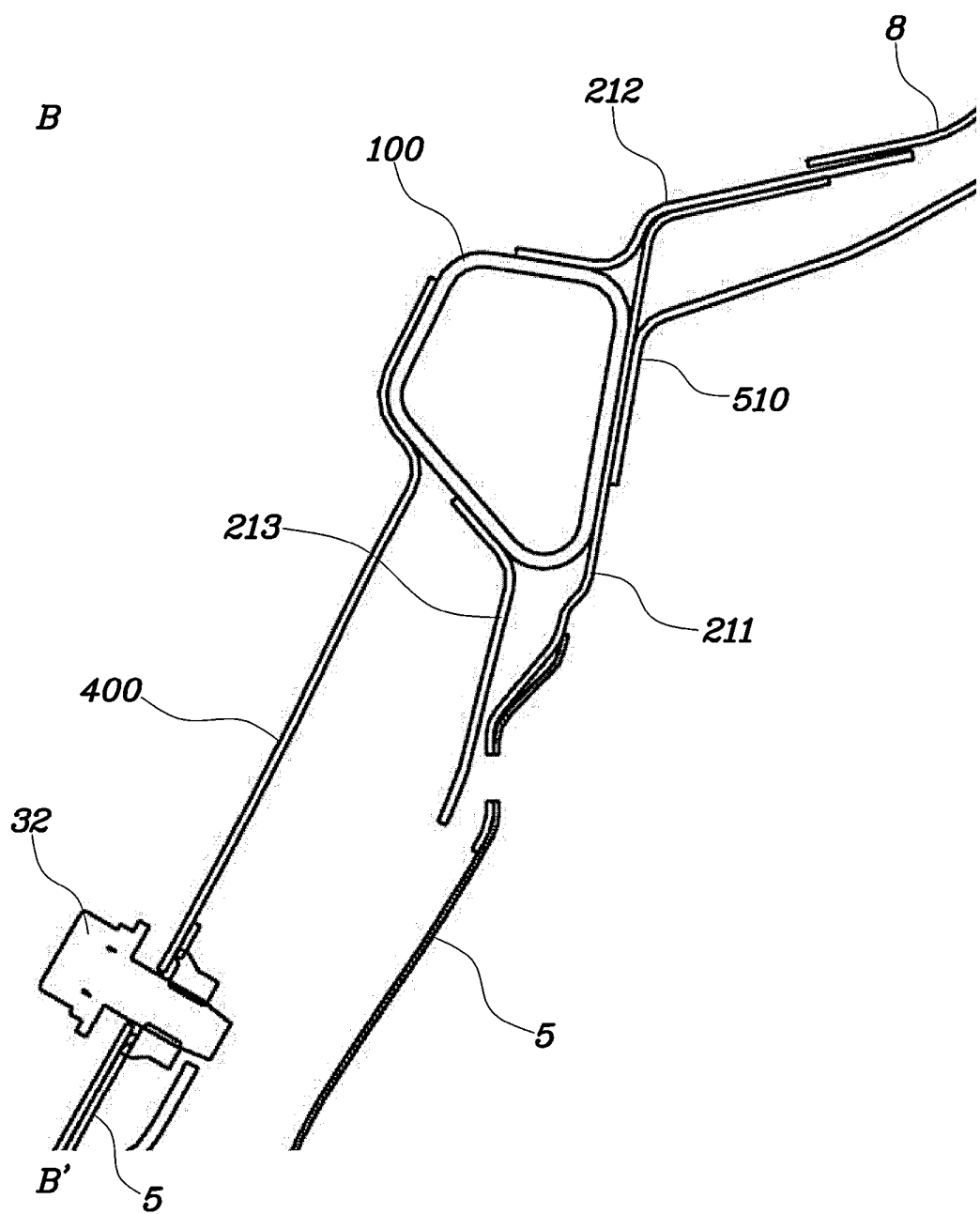
FIG. 7 is a cross-sectional view taken along line B-B' on FIG. 5.
Figure 8:
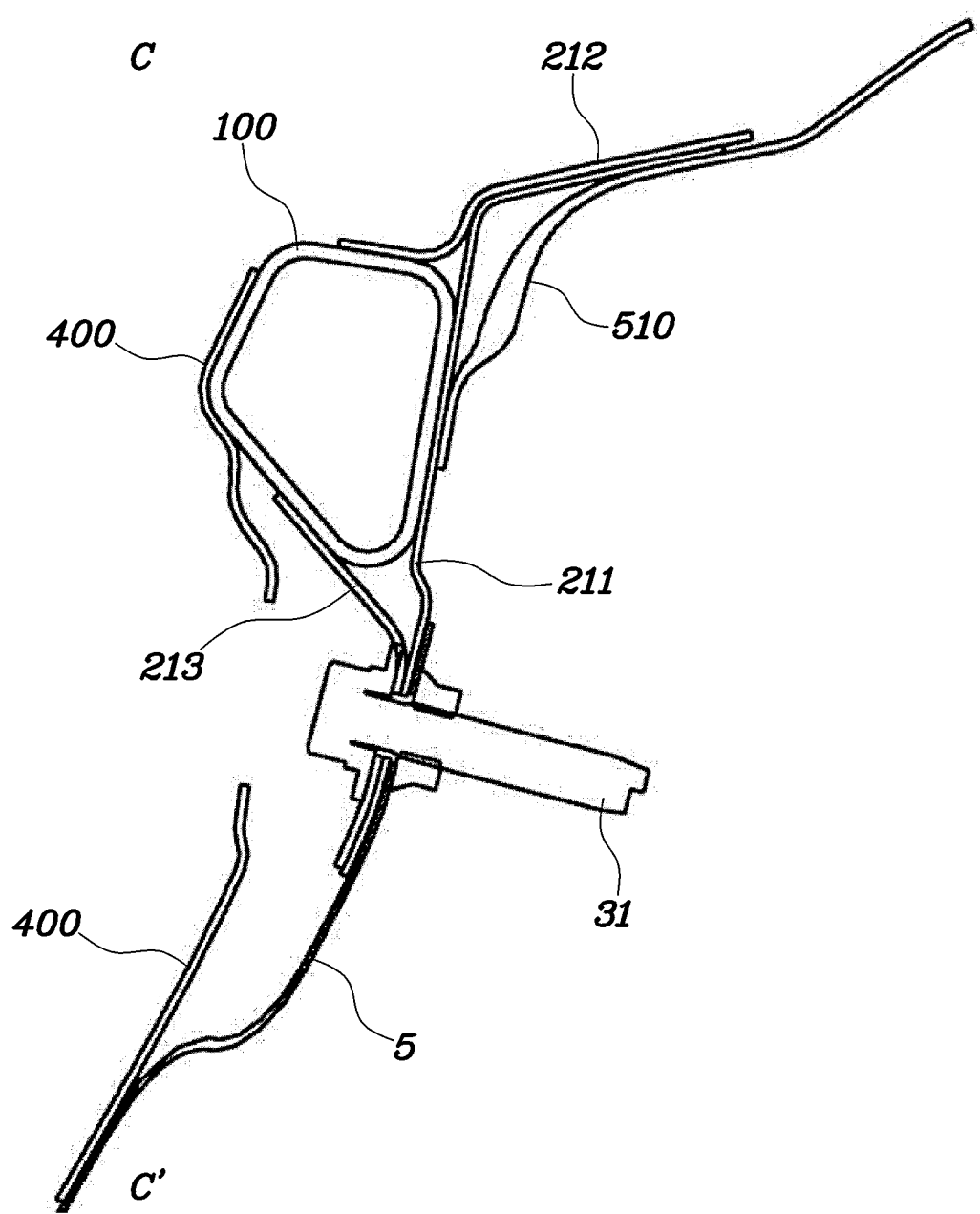
FIG. 8 is a cross-sectional view taken along line C-C' on FIG. 5.

FIG. 4 is a view that is referred to for description of a portion of the vehicle body according to the first embodiment of the present disclosure that is combined with the pillar member and the roof rails 7 and 8. FIG. 5 is an enlarged view illustrating a Z1 region of FIG. 4. FIG. 6 is a cross-sectional view taken along line A-A' on FIG. 5. FIG. 7 is a cross-sectional view taken along line B-B' on FIG. 5. FIG. 8 is a cross-sectional view taken along line C-C' on FIG. 5.

With reference to FIGS. 4 to 8, the lower flange 213, together with the inner flange 211, may support the pipe member 100 from bottom to top, and the upper flange 212, along the inner flange 211, may be supported by the pipe member 100 from bottom to top.

In this case, the inner flange 211, the upper flange 212, and the lower flange 213 may be formed of metal material. In addition, the inner flange 211, the upper flange 212, and the lower flange 213, when formed of metal material, may be combined, by welding, with the pipe member 100.

According to the first embodiment of the present disclosure, the outer panel 400 may be combined to the pipe member 100 of the roof side member 10. In this case, the outer panel 400 may be combined, for example, by welding, with the pipe member 100. Accordingly, the load applied to the outer panel 400 may be transferred directly to the pipe member 100.

The outer panel 400 may be formed in such a manner as to cover both the lower flange 213 and the upper end portion of the pillar member 5, starting from a vehicle-frame-side outer surface of the pipe member 100. Accordingly, respective parts of a lower end portion of the roof side member 10 and the upper end portion of the pillar member 5 overlap each other. Thus, the roof side member 10 and the pillar member 5 may be efficiently share the load.

According to the first embodiment of the present disclosure, the outer panel 400 may serve as a B-pillar mounting bracket, and may combine the roof side member 10 and the pillar member 5 with each other using at least one side-fastening bolt.

The side-fastening bolt may include first side-fastening bolts 31 and a second side-fastening bolt 32. The first side-fastening bolts 31 are fastened to a lower portion of the pipe member 100 in such a manner as to be spaced away from each other in the vehicle-length direction. The second side-fastening bolt 32 is fastened, between the first side-fastening bolts 31, at a lower position on the lower portion of the pipe member 100 than the first side-fastening bolts 31.

In this case, the first side-fastening bolt 31 may be fastened to the inner flange 211, the lower flange 213, and the pillar member 5 by passing therethrough, and thus may fix the flange 210 and the pillar member 5 to each other. Moreover, the second side-fastening bolt 32 may be fastened to the outer panel 400 and the pillar member 5 by passing therethrough, and thus may fix the outer panel 400 and the pillar member 5, which are combined with the pipe member 100, to each other. In other words, the roof side member 10 and the pillar member 5 are fixed to each other by the side-fastening bolt 30 and the outer panel 400. Particularly, the pipe member 100 and the pillar member 5 may be fixed to each other in a state of being coupled to each other.

The outer panel 400 may be formed to be spaced away from the lower flange 213 in a manner that is directed outward from the vehicle frame and thus to form a cross section in the forms of an open polygon, together with the lower flange 213. In this manner, a structure the rigidity of which is reinforced in the upward-downward direction may be provided.

In this case, a through-hole that has a diameter greater than a head of the first side-fastening bolt 31 may be formed in the outer panel 400 in such a manner that the outer panel 400 and the lower flange 213 may be spaced away from each other. The head of the first side-fastening bolt 31 may pass through the through-hole formed in the outer panel 400 and may be arranged in a space between the outer panel 400 and the lower flange 213.

A structure of each of the roof rails 7 and 8 of the vehicle body according to the first embodiment is described in detail below.

Figure 9:
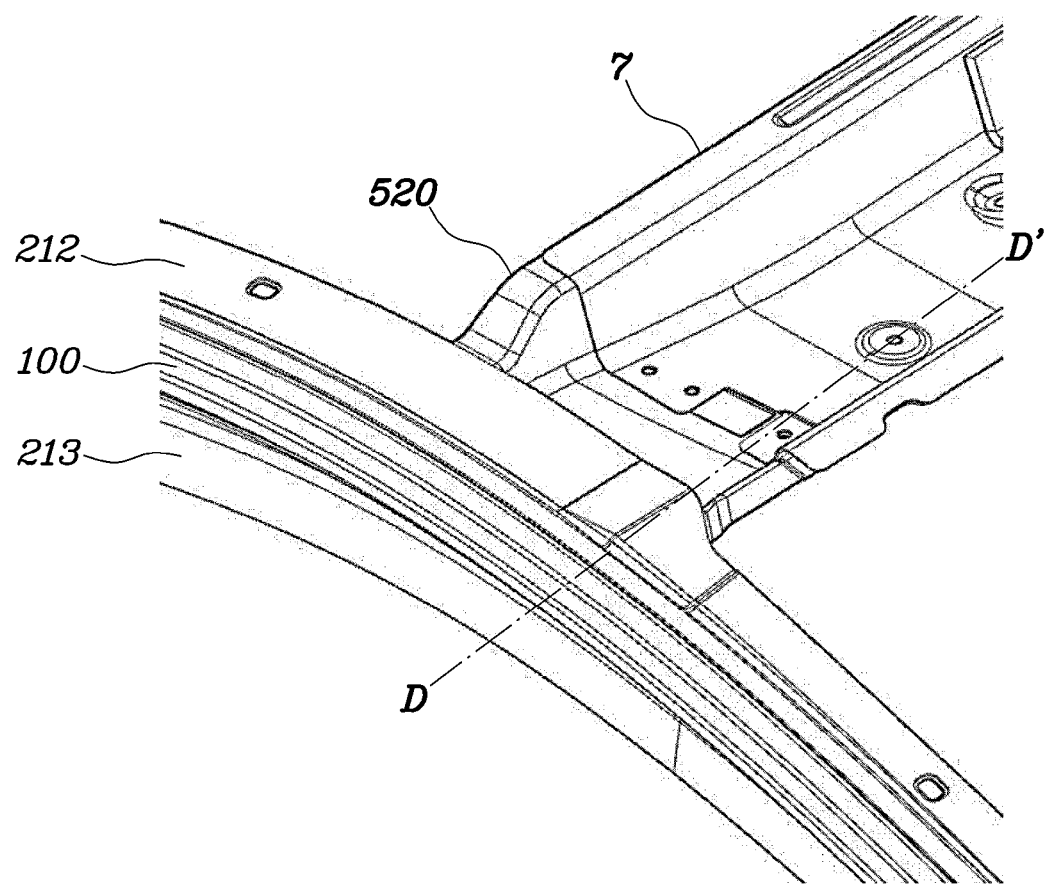
FIG. 9 is an enlarged view illustrating a Z2 region of FIG. 4.
Figure 10:
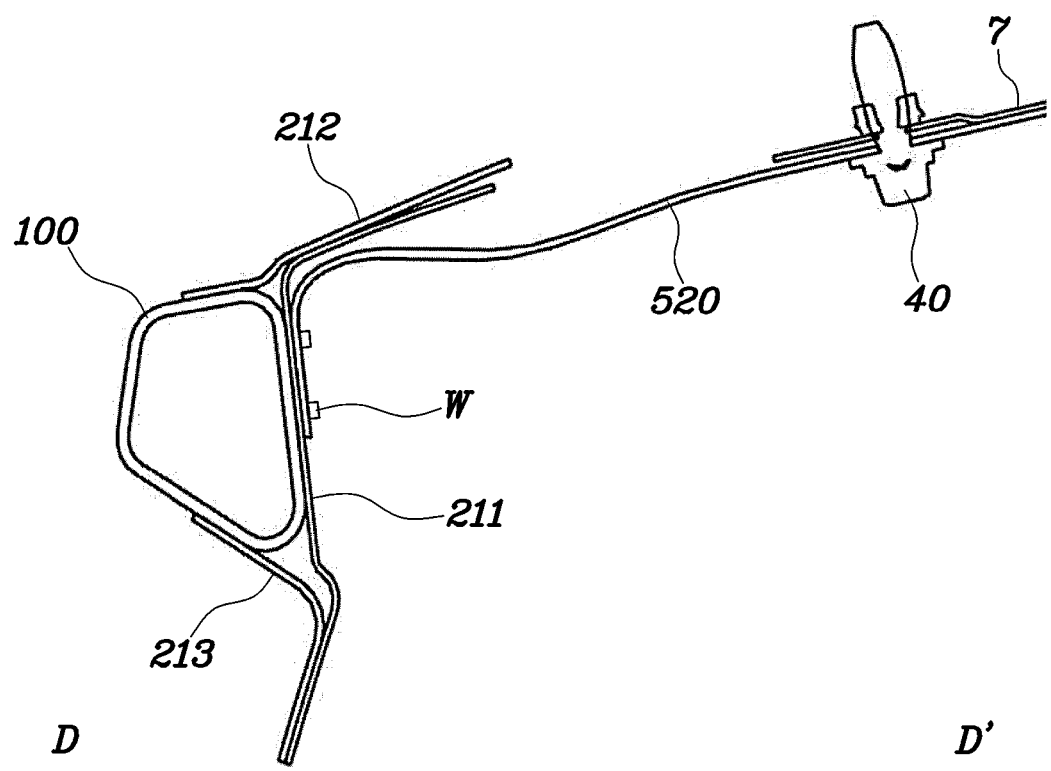
FIG. 10 is a cross-sectional view taken along line D-D' on FIG. 9.
Figure 11:
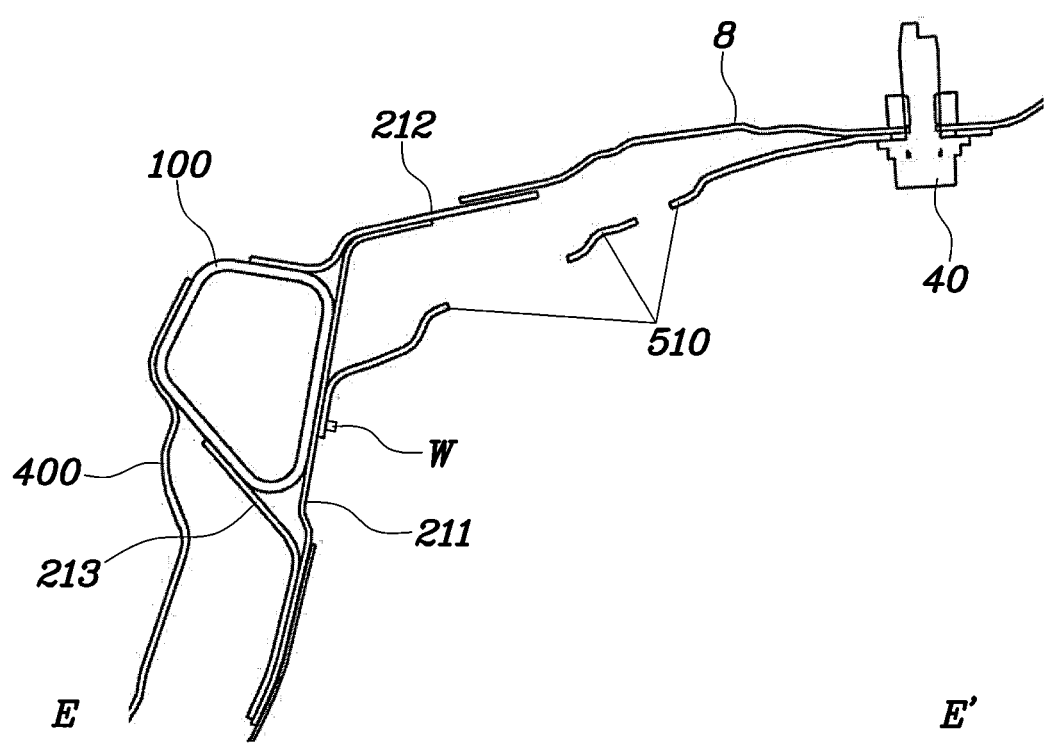
FIG. 11 is a cross-sectional view taken along E-E' on FIG. 5.

FIG. 9 is an enlarged view illustrating a Z2 region on FIG. 4. FIG. 10 is a cross-sectional view taken along line D-D' on FIG. 9. FIG. 11 is a cross-sectional view taken along E-E' on FIG. 5.

With reference to FIGS. 9 to 11, the vehicle body according to the first embodiment of the present disclosure may further include the roof rail mounting bracket 500 which extends, toward the roof rails 7 and 8, from the inner flange 211 in such a manner that the vehicle-frame-side inner end portion of the flange 210 is fixed to the roof rails 7 and 8 and to which the roof rails 7 and 8 are fastened.

The roof rail mounting bracket 500 may be combined with the inner flange 211, for example, by welding.

The roof rail mounting bracket 500 may include a first roof rail mounting bracket 510 for coupling with the center roof rail 8 and a second roof rail mounting bracket 520 for coupling with the front roof rail 7.

The roof rail mounting bracket 500 may extend to under one end portion of each of the roof rails 7 and 8 and may transfer the load applied to the roof rails 7 and 8 to the flange 210 and the pipe member 100. In this case, as illustrated in FIG. 11, the roof rail mounting bracket 500, along the upper flange 212, may support the roof rail 8.

Figure 12:
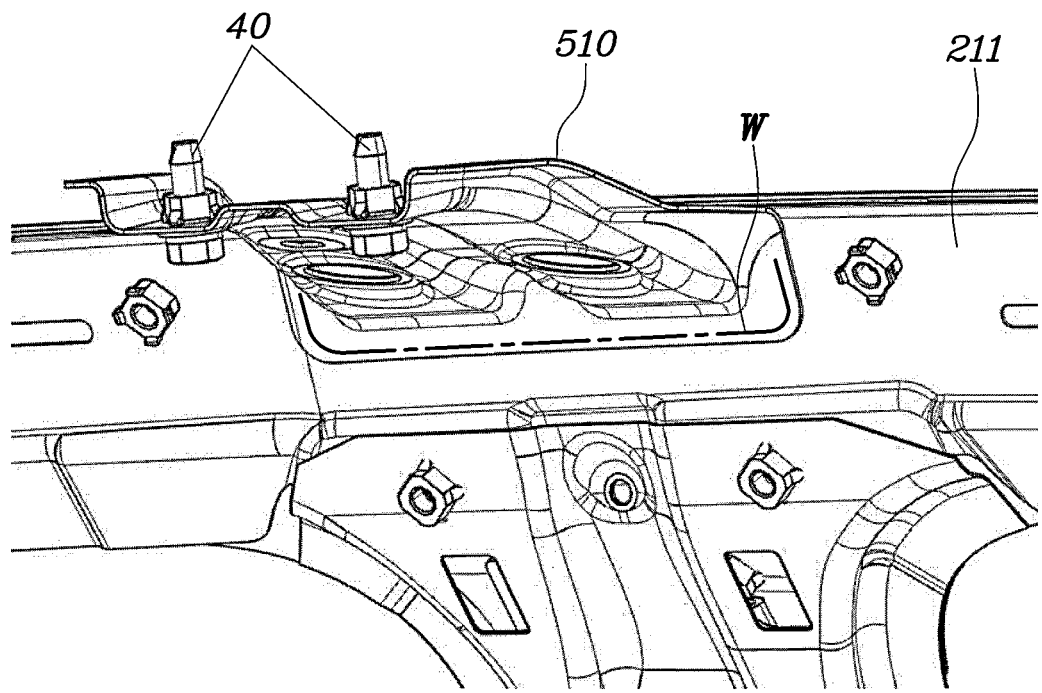
FIG. 12 is a view illustrating a region of FIG. 4 that is opposite in direction to the Z1 region of FIG. 4.

FIG. 12 is a view illustrating a region of FIG. 4 that is opposite in direction to the Z1 region of FIG. 4. With reference to FIG. 12, respective portions of the roof side member 10 and the pillar member 5 that correspond to a region indicated by oblique lines may overlap through the outer panel 400. Accordingly, the effect of distributing the load can be improved.

A configuration and structure of the vehicle body according to the second embodiment of the present disclosure is described below.

Figure 13:
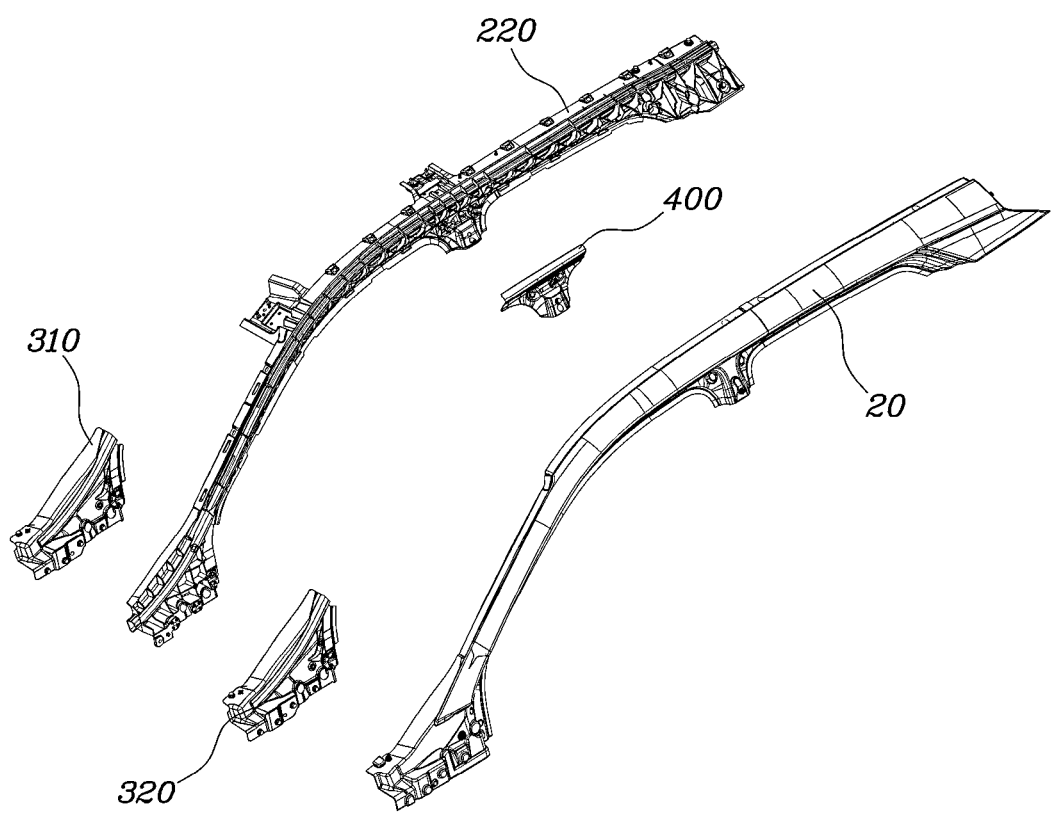
FIG. 13 is an exploded view illustrating an upper vehicle frame according to a second embodiment of the present disclosure.
Figure 14:
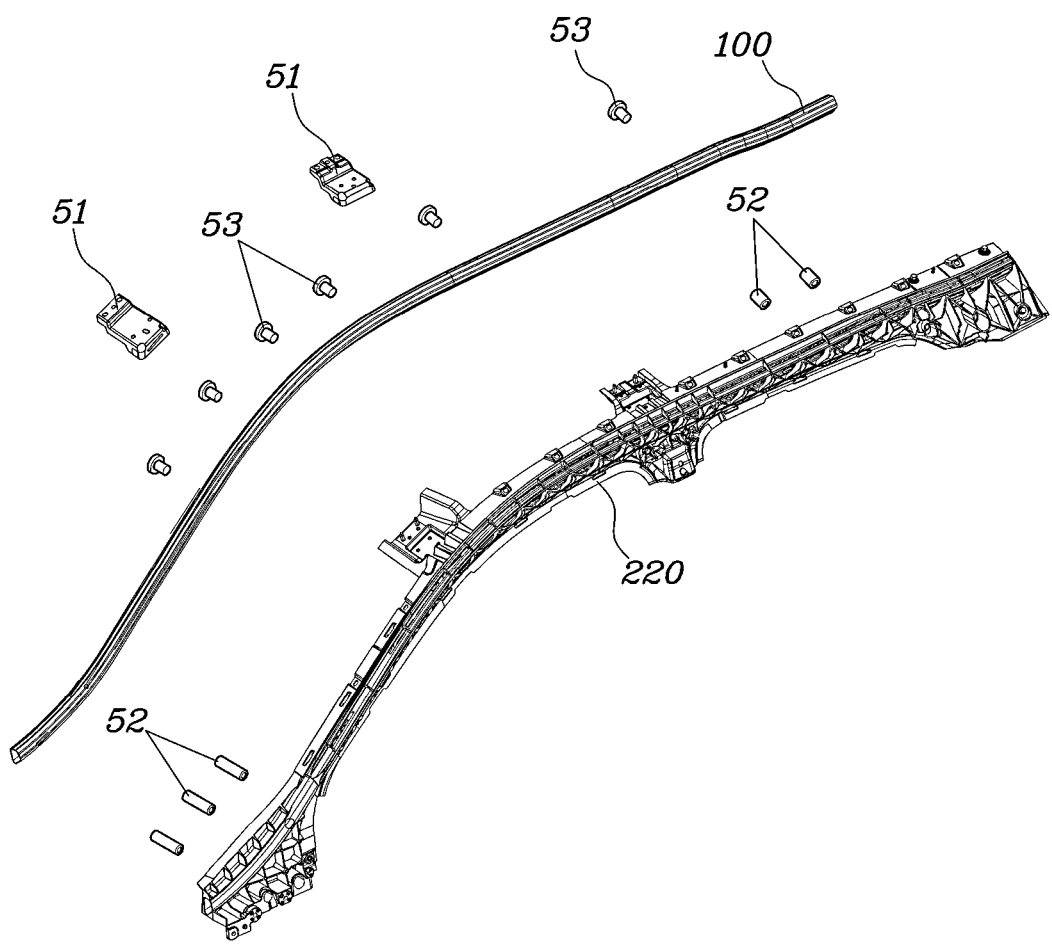
FIG. 14 is an exploded view illustrating a roof side member according to the second embodiment of the present disclosure.
Figure 15:
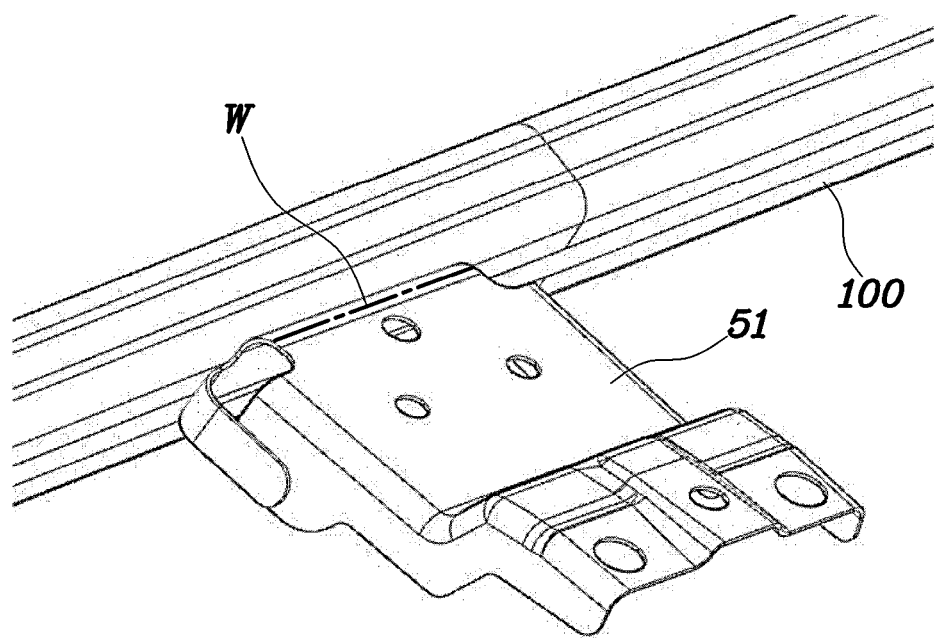
FIG. 15 is a view illustrating a coupling structure of an insert bracket according to the second embodiment of the present disclosure.

FIG. 13 is an exploded view illustrating an upper vehicle frame according to the second embodiment of the present disclosure. FIG. 14 is an exploded view illustrating a roof side member according to the second embodiment of the present disclosure. FIG. 15 is a view that is referred to for description of a coupling structure of an insert bracket according to the second embodiment of the present disclosure.

With reference to FIGS. 13 to 15, the vehicle body according to the second embodiment of the present disclosure may be configured to include the pipe member 100 may be configured to include the flange 220, an insert bracket 51, an insert nut 52, a nutsert 53, the A-pillar mounting bracket 300, and the outer panel 400.

According to the second embodiment of the present disclosure, the flange 220 may be formed by injection molding on the outside of the pipe member 100 in a state where the pipe member 100 is inserted thereinto. Moreover, with the insert nut 52 and the nutsert 53, the flange 220 may be combined with the vehicle frame and a component, such as an airbag.

The insert bracket 51 may be combined with the pipe member 100, for example, by welding.

With reference to FIGS. 16 to 20, a coupling structure of a pillar member 5 of the vehicle body according to the second embodiment of the present disclosure is described below.

Figure 16:
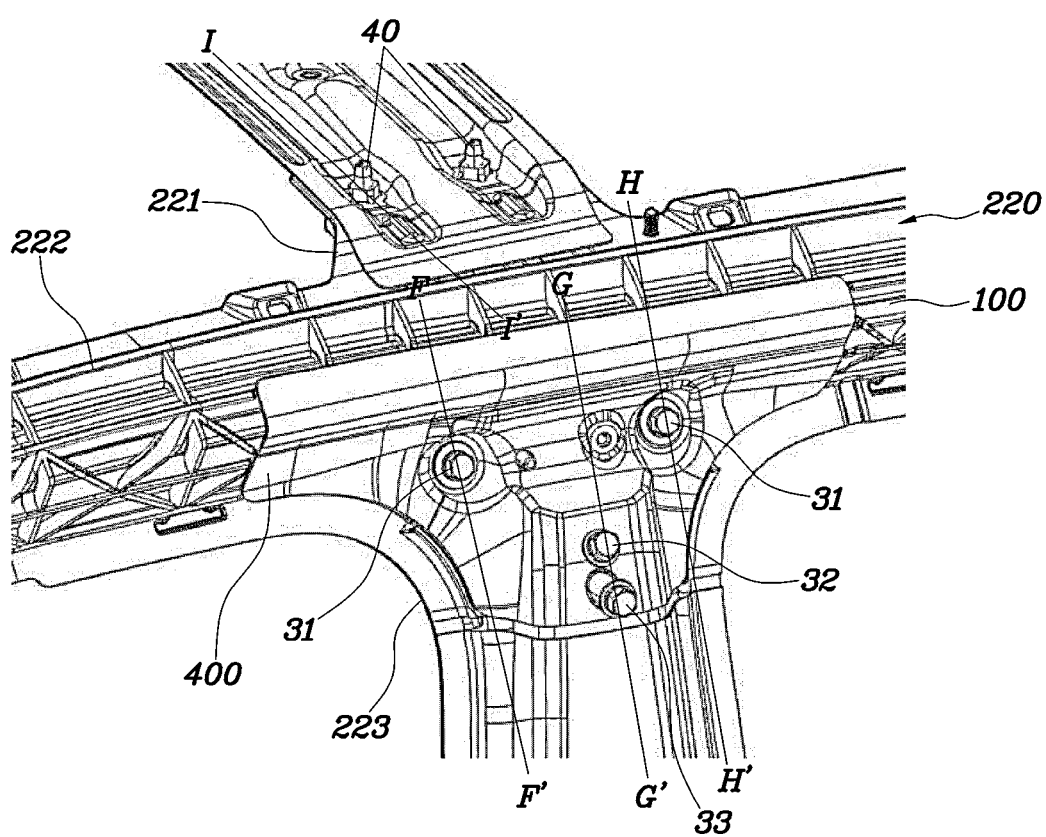
FIG. 16 is a view illustrating a portion of the roof side member according to the second embodiment of the present disclosure that is coupled to the pillar member and the roof rails.
Figure 17:
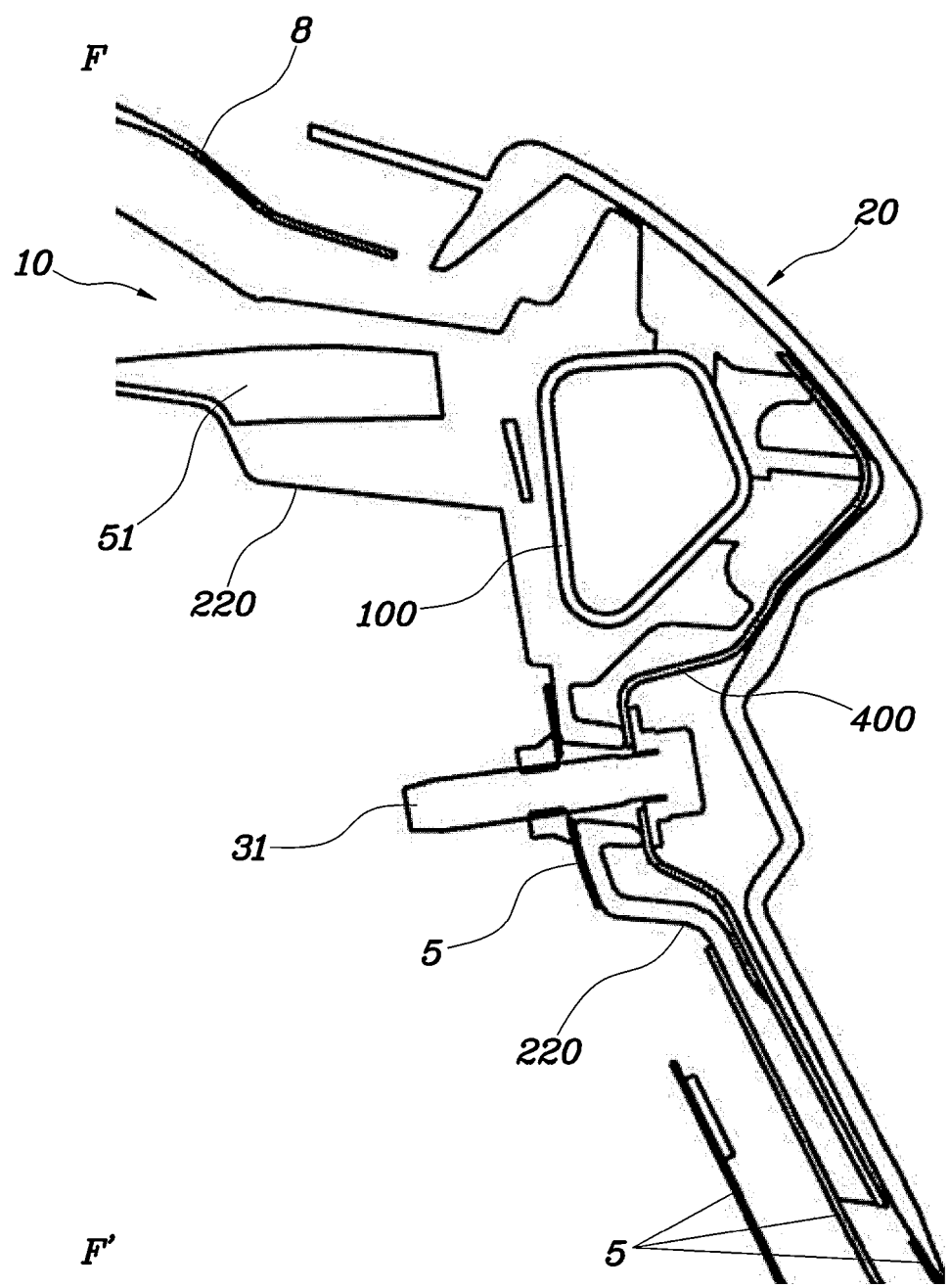
FIG. 17 is a cross-sectional view taken along line F-F' on FIG. 16.
Figure 18:
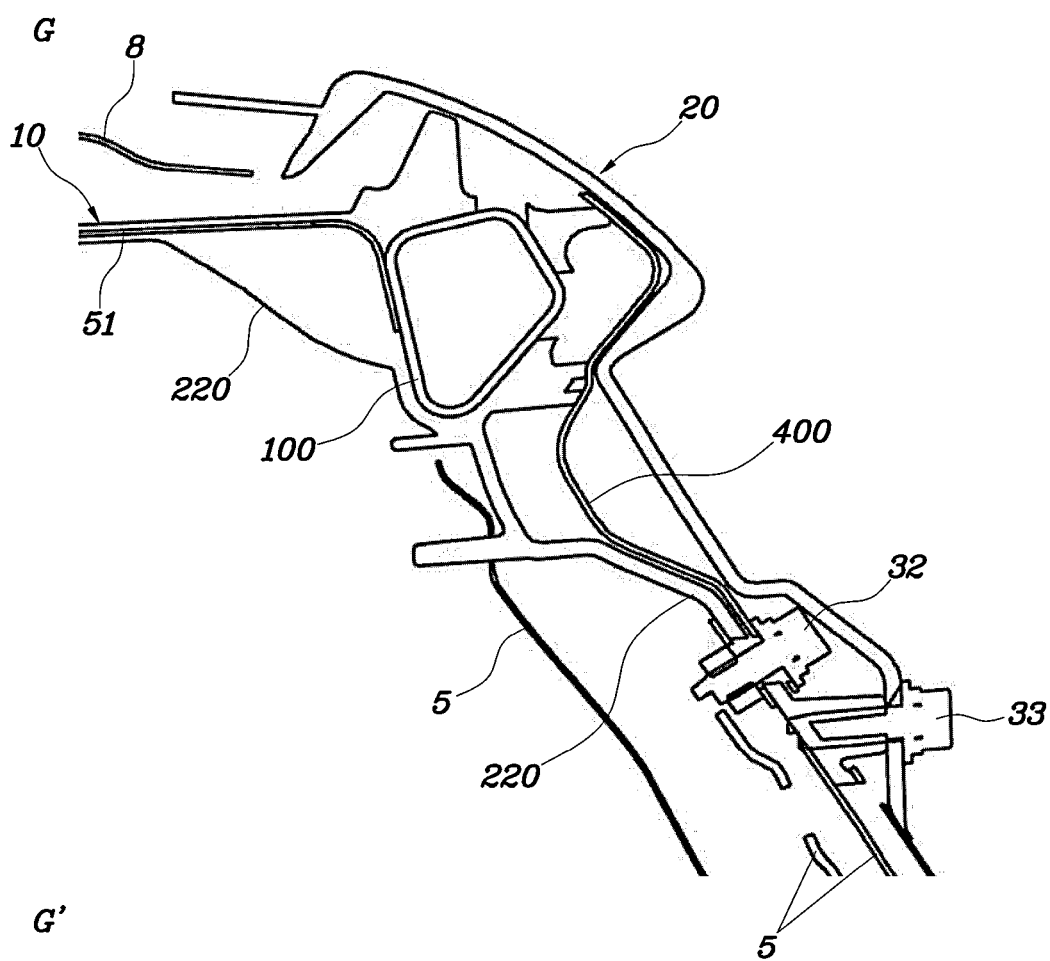
FIG. 18 is a cross-sectional view taken along line G-G' on FIG. 16.
Figure 19:
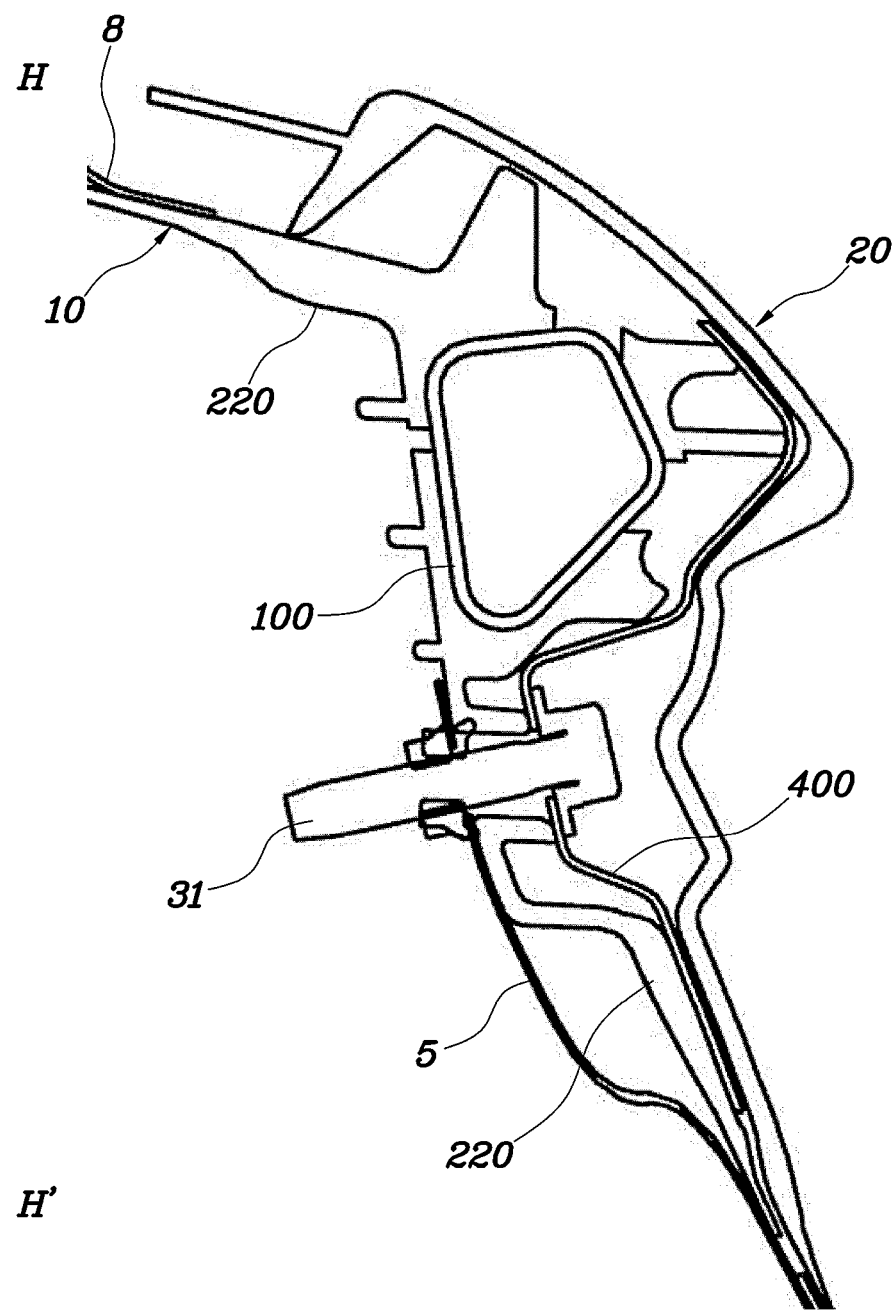
FIG. 19 is a cross-sectional view taken along line H-H' on FIG. 16.

FIG. 16 is a view illustrating a portion of the roof side member 10 according to the second embodiment of the present disclosure that is coupled to the pillar member and the roof rails 7 and 8. FIG. 17 is a cross-sectional view taken along line F-F' on FIG. 16. FIG. 18 is a cross-sectional view taken along line G-G' on FIG. 16. FIG. 19 is a cross-sectional view taken along line H-H' on FIG. 16. FIG. 20 is a view illustrating the pipe member 100 and the flange 220 that are opposite in direction to the portion of the roof side member 10 in FIG. 16.

With reference to FIGS. 16 to 20, the flange 220 may include an inner portion 221, a central portion 222, and a lower portion 223. The inner portion 221 extends from the pipe member 100 in a manner that is directed inward from the vehicle frame, and is coupled to the roof rails 7 and 8. The central portion 222 extends in the vehicle-length direction, thereby surrounding the pipe member. The lower portion 223 extends downward from the pipe member 100, thereby being coupled to the pillar member 5.

Particularly, the flange 220 may be formed in such a manner that an inner surface of the lower portion 223 thereof overlaps the pillar member 5 and that an outer surface thereof overlaps the outer panel 400.

In addition, the inner portion 221, the central portion 222, and the lower portion 223 may be integrally formed into one piece.

The outer panel 400 may be combined with the flange 220. More particularly, the outer panel 400 may reinforce the rigidity of the flange 220 by being combined with the central portion 222 and the lower portions 223 of the flange 220 and may perform a function of protecting the flange 220 formed by the injection molding.

In addition, the outer panel 400 may be accordingly made to transfer the applied load to the pipe member 100 and thus may prevent concentration of the load.

Likewise, with a plurality of the side-fastening bolts 30, the outer panel 400 may be combined with the flange 220. Unlike in the vehicle body according to the first embodiment of the present disclosure, the outer panel 400 has such a bent shape that it is bent along a curved surface of the flange 220 and, thus is combined with the flange 220 by being brought into contact therewith.

To this end, a through-hole having a smaller diameter than a head of the side-fastening bolt 30 may be formed in the outer panel 400. The side-fastening bolt may be fastened to the outer panel 400, the flange 220, and the pillar member by passing therethrough. As marked by a region indicated by oblique lines in FIG. 20, the outer panel 400, the flange 220, and the pillar member 5 may be fixed in an overlapping state.

With reference to FIG. 21, a coupling structure of each of the roof rails 7 and 8 of the vehicle body according to the second embodiment of the present disclosure is described below.

FIG. 21 is a cross-sectional view taken along line I-I' on FIG. 16.

With reference to FIG. 21, the insert bracket 51 that is combined with the vehicle-frame-side inner end portion of the pipe member 100 and extends in a manner that is directed inward from the vehicle frame may be inserted into the inner portion 221. The insert bracket 51 may reinforce the rigidity of the inner portion 221, and the inner portion 221 may be made to resist the load applied from the roof rail 8 in an easier manner.

Particularly, in this case, the inner portion 221 may be formed by the injection molding in a state where the insert bracket 51, together with the pipe member 100, is inserted thereinto.

As described above, according to the embodiments of the present disclosure, the number of components of the vehicle frame can be decreased, and one portion of the vehicle frame can vary readily in configuration. A structure of the vehicle frame can be provided in such a manner as to ensure competitiveness in the future mobility market that depends on the trend toward small quantity batch production.

As described above, the specific embodiments of the present disclosure are described above with every feature thereof being illustrated in the drawings, and it would be obvious to a person of ordinary skill in the art that various modifications and alterations are possibly made to the present disclosure without departing from the technical idea of the present disclosure.

What is claimed is:

1. A vehicle body comprising:
a roof side member comprising a hollow pipe member configured to extend in a bent state along a lengthwise direction, and a flange surrounding at least one portion of the pipe member, wherein a vehicle-frame-side inner end portion of the flange is fixed to a roof rail, and a lower end portion of the flange extends downward from the pipe member and is fixed to a pillar member; and
an outer panel combined with an outside of the roof side member and configured to form a load path between the roof side member and the pillar member by coupling a lower end portion of the roof side member and an upper end portion of the pillar member to each other.

2. The vehicle body of claim 1, wherein the outer panel extends downward while being supported on a vehicle-frame-side outer surface of the roof side member, and the outer panel is bent inward from a vehicle frame along a curved lower portion of the roof side member, thereby supporting the pipe member.

3. The vehicle body of claim 2, wherein:
the outer panel is configured to extend in a vehicle-length direction and to overlap one part of a lower end portion of the roof side member, and
the outer panel is configured to extend downward from a center portion thereof and to overlap one part of an upper end portion of the pillar member.

4. The vehicle body of claim 1, wherein the flange, the pillar member, and the outer panel are fixed to one another through at least one side-fastening bolt fastened toward a vehicle-width direction from under the pipe member.

5. The vehicle body of claim 4, wherein the side-fastening bolt is fastened to the outer panel, the flange, and the pillar member by sequentially passing therethrough.

6. The vehicle body of claim 4, wherein the side-fastening bolts are arranged to be spaced away from each other in an upward-downward direction and in a vehicle-length direction such that a load transferred from the pillar member to the pipe member is distributed.

7. The vehicle body of claim 1, wherein the vehicle-frame-side inner end portion of the flange is coupled to a lower part of one end portion of the roof rail such that a load applied to a roof rail is transferred to the pipe member, and thus the flange supports the roof rail.

8. The vehicle body of claim 7, wherein the inner end portion of the flange and the one end portion of the roof rail are fixed to each other through at least one vertically fastening bolt fastened in an upward-downward direction.

9. The vehicle body of claim 1, wherein the flange comprises:
an inner flange combined, along a vehicle-length direction, with a vehicle-frame-side inner surface of the pipe member, the inner flange configured to extend vertically from the pipe member;
an upper flange combined, along the vehicle-length direction, with an upper portion of the pipe member, the upper flange configured to extend from the pipe member in a manner that is directed inward from a vehicle frame; and
a lower flange combined with a lower portion of the pipe member along a vehicle-length direction, the lower flange configured to extend downward from the pipe member.

10. The vehicle body of claim 9, wherein the inner flange, the upper flange, and the lower flange are formed of metal material.

11. The vehicle body of claim 9, wherein the outer panel is combined with the pipe member.

12. The vehicle body of claim 11, wherein the outer panel is configured to cover both the lower flange and the upper end portion of the pillar member, starting from a vehicle-frame-side outer surface of the pipe member.

13. The vehicle body of claim 12, wherein the outer panel is spaced away from the lower flange in a manner that is directed outward from the vehicle frame and configured to form a cross section in the forms of an open polygon, together with the lower flange.

14. The vehicle body of claim 9, further comprising: a roof rail mounting bracket extending toward the roof rail from the inner flange in such a manner that the vehicle-frame-side inner end portion of the flange is fixed to the roof rail, the roof rail being fastened to the roof rail mounting bracket.

15. The vehicle body of claim 1, wherein the flange is formed by injection molding on an outside of the pipe member in a state where the pipe member is inserted thereinto, and
wherein the flange comprises:
an inner portion extending from the pipe member in a manner that is directed inward from a vehicle frame and coupled to the roof rail;
a central portion extending in a vehicle-length direction, thereby surrounding the pipe member; and
a lower portion extending downward from the pipe member, thereby being coupled to the pillar member.

16. The vehicle body of claim 15, wherein the outer panel is combined with the flange.

17. The vehicle body of claim 15, wherein an inner surface of the lower portion overlaps the pillar member, and an outer surface of the lower portion overlaps the outer panel.

18. The vehicle body of claim 15, wherein an insert bracket is combined with a vehicle-frame-side inner end portion of the pipe member and configured to extend inward from the vehicle frame and be inserted into the inner portion.

19. The vehicle body of claim 18, wherein the inner portion is formed by injection molding in a state where the insert bracket, together with the pipe member, is inserted thereinto.

20. The vehicle body of claim 15, wherein the inner portion, the central portion, and the lower portion of the flange are integrally formed into one piece.

* * * * *